United States Patent
Carra et al.

(10) Patent No.: US 7,344,688 B2
(45) Date of Patent: Mar. 18, 2008

(54) PROCESS FOR TREATING ALKALI METALS CHARGED WITH TRITIUM OR COMPONENTS CONTAMINATED WITH ALKALI METALS CHARGED WITH TRITIUM

(75) Inventors: Olivier Carra, Peyrins (FR); Yves Demoisy, Jouques (FR)

(73) Assignee: Framatome ANP, Courbevoie (FR)

( * ) Notice: Subject to any disclaimer, the term of this patent is extended or adjusted under 35 U.S.C. 154(b) by 504 days.

(21) Appl. No.: 10/920,417

(22) Filed: Aug. 18, 2004

(65) Prior Publication Data

US 2008/0003164 A1    Jan. 3, 2008

(30) Foreign Application Priority Data

Aug. 19, 2003  (FR) .................................. 03 10016

(51) Int. Cl.
*C01B 5/02* (2006.01)
(52) U.S. Cl. .................. 423/249; 423/421; 423/422; 423/580.2; 423/657
(58) Field of Classification Search ........... 423/580.2, 423/580.1, 648.1, 647.7, 249, 657, 421, 422
See application file for complete search history.

(56) References Cited

U.S. PATENT DOCUMENTS

| | | | |
|---|---|---|---|
| 4,000,978 A | * | 1/1977 | Henrie .................. 422/109 |
| 4,139,603 A | * | 2/1979 | Weems et al. ........... 423/580.1 |
| 4,171,350 A | * | 10/1979 | Sanders .................. 423/580.1 |
| 4,356,163 A | * | 10/1982 | Davidson ................ 423/648.1 |
| 4,424,903 A | | 1/1984 | Knieper et al. |
| 4,780,271 A | * | 10/1988 | Dezubay et al. ........... 376/300 |

FOREIGN PATENT DOCUMENTS

DE    42 10 831 C    7/1993

OTHER PUBLICATIONS

International Search Report No. FR 03 10016, dated May 27, 2004.

* cited by examiner

*Primary Examiner*—Wayne A. Langel
(74) *Attorney, Agent, or Firm*—Connolly Bove Lodge & Hutz LLP

(57) ABSTRACT

The invention relates to a process for treating alkali metals such as sodium charged with tritium or components contaminated with alkali metals such as sodium charged with tritium, in which the alkali metal is reacted with liquid water or water vapor, so as to obtain hydrogen and tritiated hydrogen, characterized in that the hydrogen and the tritiated hydrogen are subjected, in a recombiner (2) to a treatment of catalytic recombination by the addition of oxygen so as to obtain water and tritiated water, and in that the water and the tritiated water are treated so that they are not discharged into the environment.

Figure 1:
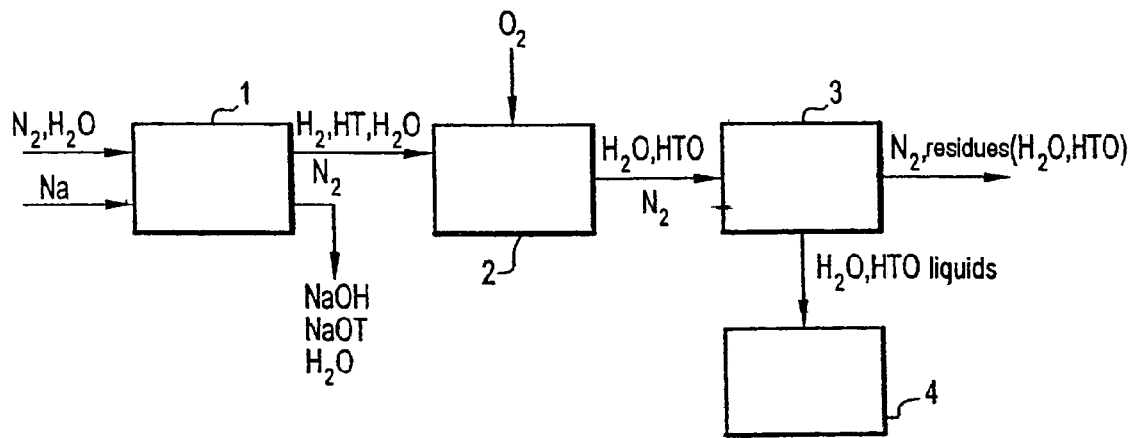

The invention also relates to a plant for carrying out the process.

14 Claims, 4 Drawing Sheets

PROCESS FOR TREATING ALKALI METALS CHARGED WITH TRITIUM OR COMPONENTS CONTAMINATED WITH ALKALI METALS CHARGED WITH TRITIUM

The invention relates to the field of trapping the tritium contained in gaseous effluents which have come for example from the treatment of nuclear power station components which have been in contact with an active alkali metal such as sodium.

During the dismantling of components of nuclear reactors which have been in contact with sodium, particularly components of fast neutron reactors (FNR) components such as pumps, heat exchangers, cold traps, circuits and pipes, in particular, are emptied beforehand of the sodium which they contain. However, there is still residual sodium in contact with them in the form of films or retained matter. As sodium is chemically very active it is essential to remove it completely from the components by a washing operation.

This washing is generally done with water according to the reaction:

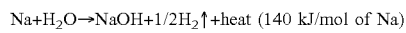
$Na + H_2O \rightarrow NaOH + 1/2 H_2 \uparrow + heat$ (140 kJ/mol of Na)

Similarly, when a fast neutron reactor is closed down, masses of sodium are recovered which have to be destroyed using this same chemical reaction. Liquid water is used for this purpose, placed in a reactor into which the sodium is injected in small quantities.

This reaction is violent and gives off hydrogen, producing a risk of combustion and even explosion. Therefore it has to be done in a controlled manner. For treating materials which are contaminated with sodium this is done by flushing the component with a neutral gas such as nitrogen which has previously been moistened (charged with water vapour). In this way the quantity of water arriving on the sodium at a given moment is minimised, resulting in a limited release of hydrogen. Moreover this limited release of hydrogen is diluted in a neutral atmosphere, which makes it possible to control the risks connected with this gas. For destroying sodium en masse a small amount of sodium is injected into a large volume of water. Here it is therefore water which is in excess in relation to the sodium, while the opposite is true in the case of steam treatment of components contaminated with sodium.

Sodium contains tritium which is largely found in the gaseous effluents which come from the washing operation. These gaseous effluents comprise:
  in the case of the treatment of components, neutral gas (generally nitrogen), hydrogen, tritiated hydrogen and water vapour which has not reacted with the sodium;
  in the case of the destruction of sodium, hydrogen and tritiated hydrogen.

Sometimes there is only sodium remaining in the component but also there may be sodium hydride NaH. This hydride is also destroyed by water according to the equation

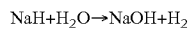
$NaH + H_2O \rightarrow NaOH + H_2$

NaH is a highly tritiated product: the H atom is often replaced by T.

The same problem arises for the destruction of other alkali metals such as potassium, the alloys thereof (for example the Na—K alloy) and the hydrides and oxides thereof.

As tritium is a radioactive compound it is important to recover it as completely as possible after the destruction of the alkali metal.

The aim of the invention is to propose a process for destroying alkali metals charged with tritium and for treating components contaminated by alkali metals charged with tritium which minimises as far as possible the tritium waste discharged outside the treatment plant.

To this end, the invention relates to a process for processing alkali metals such as sodium charged with tritium or components contaminated with alkali metals such as sodium charged with tritium, wherein the alkali metal is reacted with liquid water or water vapour, so as to obtain hydrogen and tritiated hydrogen, characterised in that the hydrogen and the tritiated hydrogen are subjected, in a recombiner, to a catalytic recombination treatment by the addition of oxygen so as to obtain water and tritiated water, and in that the water and the tritiated water are treated so as not to be discharged into the environment.

According to a first alternative embodiment of the invention the alkali metals are reacted with water vapour mixed with a neutral gas.

According to a second alternative embodiment of the invention, the alkali metals are reacted with water vapour and $CO_2$ mixed with a neutral gas and the reaction of the alkali metals with water vapour and the $CO_2$ produces the carbonate of said metals and/or partially tritiated bicarbonate of said metals.

After the catalytic recombination, the water and tritiated water on the one hand and the remainder of the gaseous effluent on the other hand can be separated in separating means.

This separation may take place in a condenser in which the water and the tritiated water are condensed.

The water and tritiated water collected at the outlet from the separating means can be recycled to participate in the reaction of the alkali metals with liquid water or water vapour and optionally with $CO_2$.

The remainder of the gaseous effluent may also be recycled to participate in the reaction of the alkali metals with water vapour and optionally with $CO_2$.

Hydrogen may also be added during the catalytic recombination.

After the catalytic recombination, the water, tritiated water, neutral gas and any excess $CO_2$ may be recycled to participate in the reaction of the alkali metals with water vapour and optionally $CO_2$, without separation of the water and tritiated water from the neutral gas and any excess $CO_2$.

The remainder of the gaseous effluent separated essentially from the water and tritiated water can pass through a desiccator with regenerable desiccant and the hot regeneration gas which passed through the desiccators can be recycled upstream of said separating means.

At least some of the dried gas leaving the desiccator with regenerable desiccant can be used, optionally after reheating, as a hot regeneration gas for said desiccator.

The remainder of the gaseous effluent substantially separated from water and tritiated water may pass through a set of desiccators containing regenerable desiccant and means for separating the water and tritiated water, such as condensers arranged in cascade, the hot regeneration gas leaving each desiccator being passed into said means for separating the water and tritiated water.

Non-tritiated water may be added to the gases leaving the recombiner, upstream of the separating means and/or into said separating means.

The liquid tritiated effluent can be processed in a cementation plant.

The invention also relates to a plant for processing alkali metals such as sodium or components contaminated with alkali metals, said alkali metals containing tritium, characterised in that it comprises:

- a reactor for carrying out said processing by destruction of said alkali metals using liquid water or water vapour mixed with a neutral gas;
- means for extracting from said reactor the gaseous products containing hydrogen and tritiated hydrogen which are present therein;
- a catalytic recombiner and means for introducing into said recombiner said gaseous products extracted from the reactor and oxygen to form water and tritiated water from the hydrogen and tritiated hydrogen contained in said gaseous products.

The plant may also comprise means for introducing $CO_2$ into said reactor.

It may also comprise, downstream of the recombiner, means for separating the water and tritiated water from the other compounds extracted from the recombiner, so that said other compounds contain no more than residues of water and tritiated water.

The means for separating the water and tritiated water may consist of a condenser.

The plant may also comprise means for recycling, upstream of the reactor, the compounds extracted from the recombiner.

It may also comprise means for recycling, upstream of the reactor, the water and tritiated water leaving said separating means.

It may also comprise means for recycling, upstream of the reactor, the compounds leaving said separating means other than the water and tritiated water separated off.

It may also comprise means for introducing hydrogen into the recombiner.

It may also comprise a desiccator with a regenerable desiccant, means for introducing into said desiccator the compounds other than water and tritiated water extracted from the separating means and containing only residues of water and tritiated water, and means for recycling, upstream of said separating means, the regeneration gases charged with water and tritiated water leaving the desiccator.

It may also comprise means for recycling, as regeneration gases for the desiccator, all or some of the gases which have passed through the desiccator.

It may also comprise, for processing compounds other than water and tritiated water leaving the separating means, and containing only residues of water or tritiated water, a set of desiccators with regenerable desiccant and means for separating the water and tritiated water which are arranged in cascade, the regeneration gases leaving the desiccators being introduced into the separating means.

It may also comprise means for introducing non-tritiated water upstream of the separating means or into said separating means.

It may comprise means for extracting, from said reactor, the liquid products leaving the reaction of the alkali metals with water or water vapour and optionally $CO_2$.

It may also comprise a cementation plant processing the tritiated liquid effluents leaving said reactor and/or said separating means.

The reactor may consist of said components contaminated with the alkali metals themselves.

As will be appreciated, the chief aspect of the invention consists of subjecting the gaseous effluents produced by the operation of destroying the sodium (or other alkali metal) and its compounds (hydride, oxide, Na—K alloy) with water to a catalytic recombination treatment.

In this way a gaseous effluent is recovered which contains water vapour and tritiated water vapour. These are then extracted from the gaseous effluent which can then be discharged without any danger to the environment. The water and tritiated water are stored or themselves processed, notably by dilution then disposal or by electrolysis.

According to one aspect of the invention, the water and tritiated water obtained may advantageously be recycled, in gaseous or liquid form, to participate themselves in the destruction of the sodium. In this case, separation of the water vapour from the remainder of the gaseous effluent may optionally be omitted, recycling all the effluents.

According to another aspect of the invention, the extraction of the water vapour and tritiated water vapour from the gaseous effluent can be carried out using a condenser and a desiccator with a regenerable desiccant.

According to another aspect of the invention, additional water vapour may be added upstream of the extraction process or during this extraction, so as to dilute the tritium in non-tritiated water. By operating in this manner, the capacity of the plant for extracting water vapour is utilised in an optimum manner, thus making it possible to recover more tritium.

Figure 2:
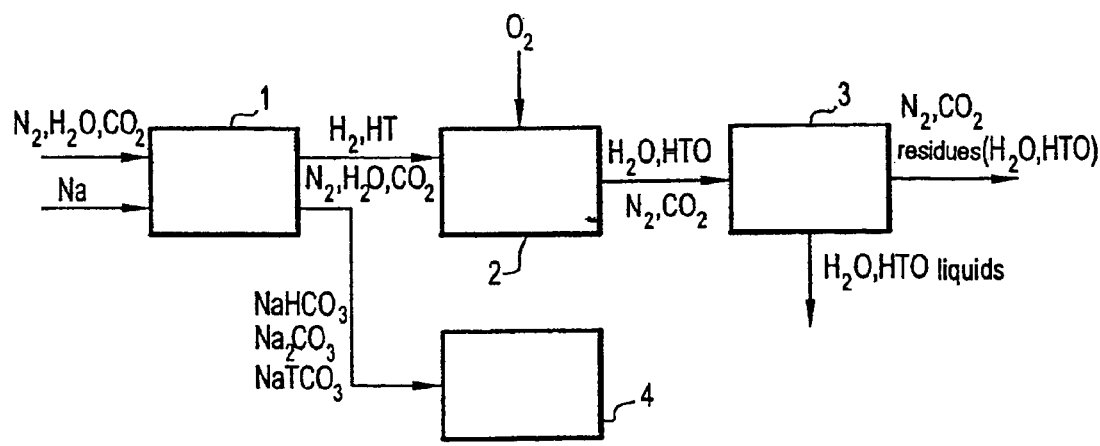
Figure 3:
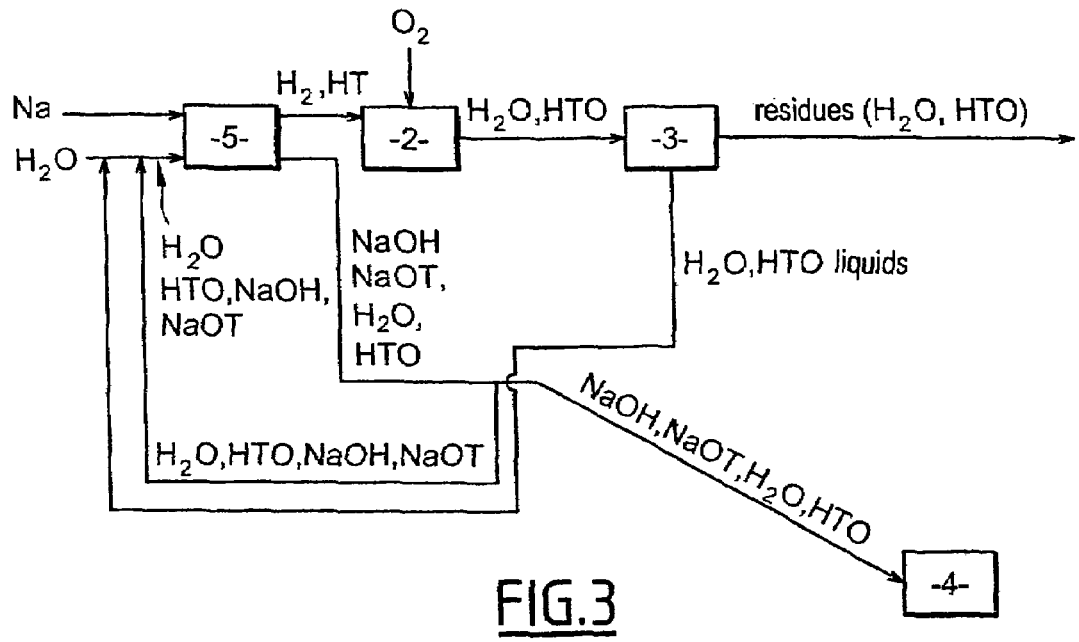
Figure 4:
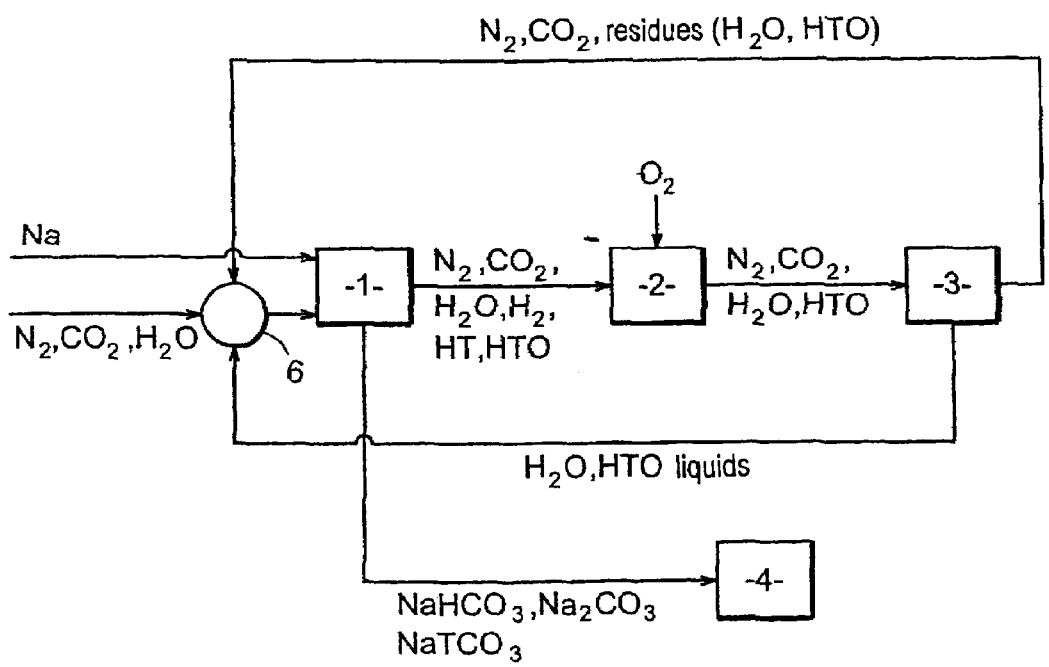
Figure 5:
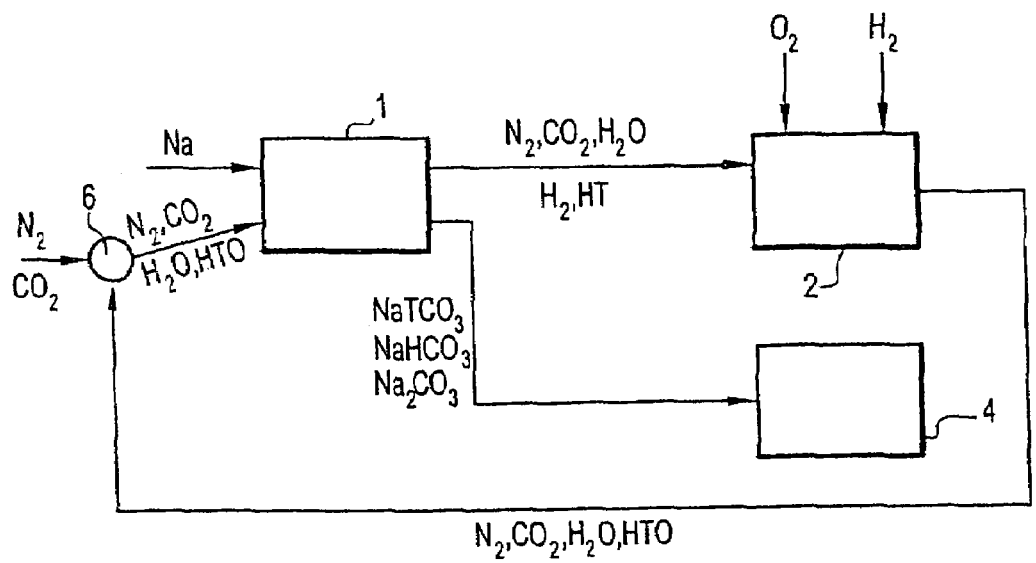
Figure 6:
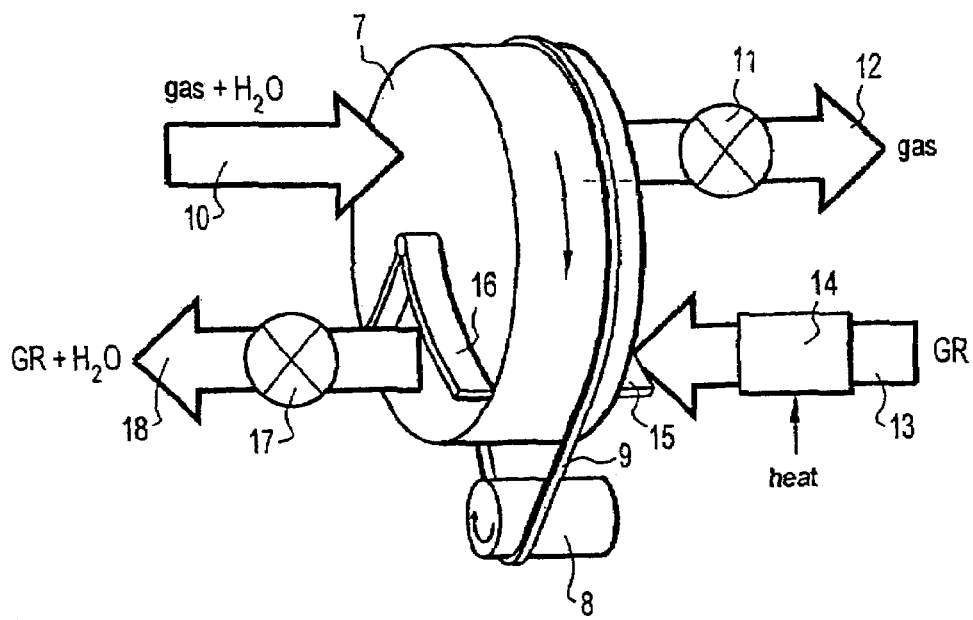
Figure 7:
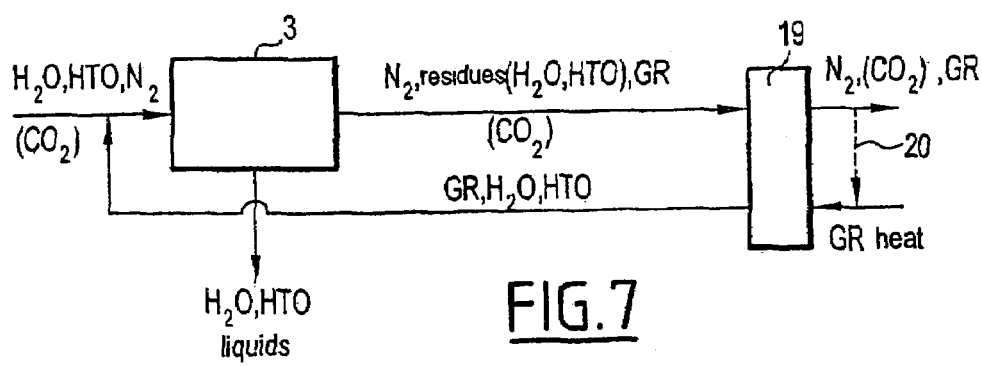
Figure 8:
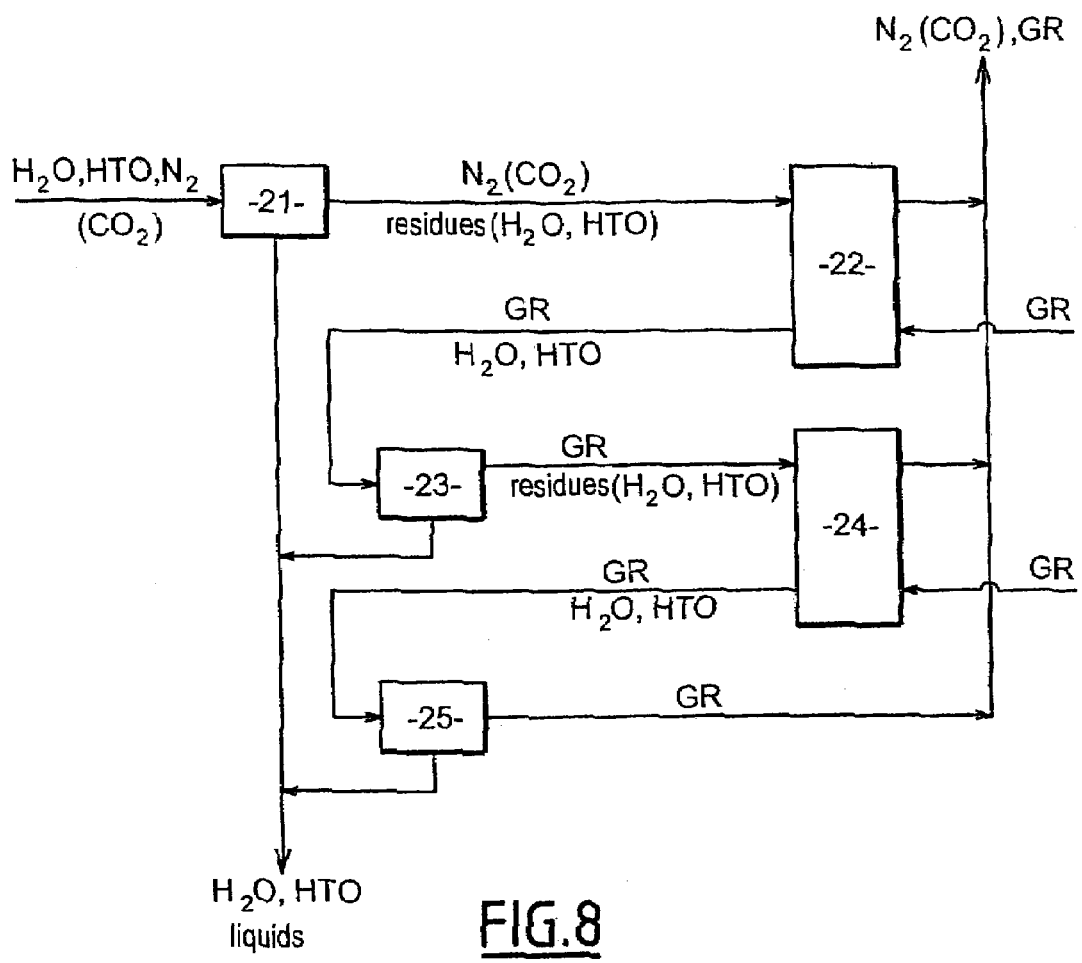
Figure 9:
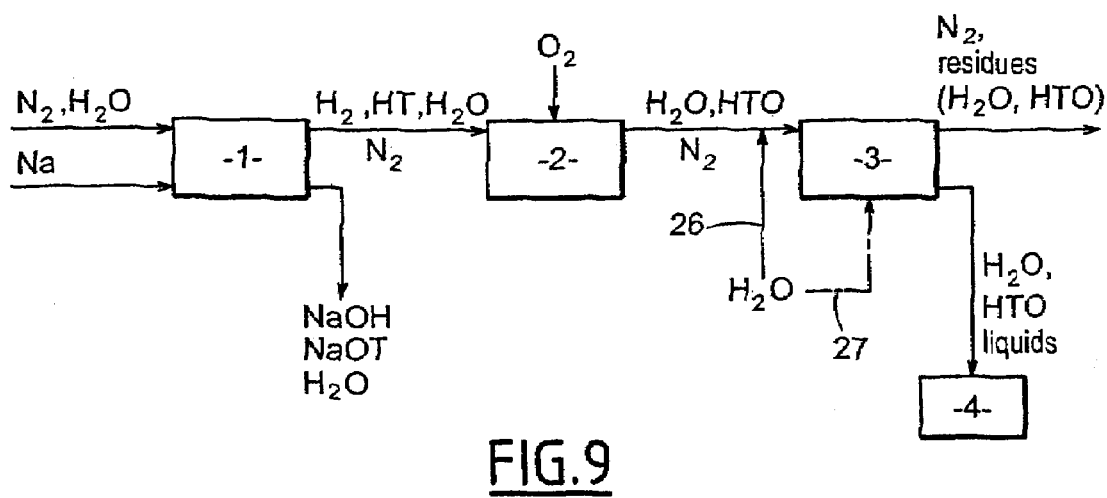

The invention will be better understood from a study of the description that follows, which refers to the following accompanying drawings:

FIG. 1, which diagrammatically shows the different steps of the process according to the invention, used for destroying sodium with damp nitrogen;

FIG. 2, which diagrammatically shows the different steps of the process according to the invention, applied to the destruction of sodium by carbonation;

FIG. 3, which diagrammatically shows an alternative embodiment of the process according to the invention wherein the water and tritiated water collected are recycled to participate in the destruction of the sodium en mass by immersion in liquid water;

FIG. 4, which diagrammatically shows an alternative embodiment of the process according to the invention in which water, tritiated water and the gases collected at the exit from the condenser are recycled to participate in the destruction of the sodium by carbonation;

FIG. 5, which diagrammatically shows an alternative embodiment of the process according to the invention wherein the water, the tritiated water and gases collected at the exit from the recombiner are recycled to participate in the destruction of the sodium by carbonation, without passing through a condenser;

FIG. 6, which outlines the operating principle of a desiccator with regenerable desiccant of the "sorption wheel type";

FIG. 7, which diagrammatically shows an alternative embodiment of the process according to the invention wherein the condenser is coupled to a desiccator with regenerable desiccant;

FIG. 8, which diagrammatically shows an alternative embodiment of the process according to the invention in which a set of condensers and desiccators with regenerable desiccant which are arranged in a cascade is used;

FIG. 9, which diagrammatically shows an alternative embodiment of the process according to the invention in which non-tritiated water is added upstream of the condenser.

It should be understood that throughout the remainder of the description the term "sodium" refers not only to pure sodium but also to its compounds (hydride, Na—K, etc.) and the other alkali metals to which the invention may be applied.

The process according to the invention, of which a version of the succession of steps is shown in FIG. 1, starts with an operation of treating sodium which is carried out in a reactor 1.

It should be understood that this reactor 1 may be a container which is specially dedicated to performing the reaction. However, in the case of the processing of components consisting of hollow bodies in which sodium has circulated and is still present in residual amounts (for example pipe work or a cold trap), the reactor 1 may consist of these hollow bodies themselves through which the reagents are passed.

The components contaminated with sodium which are to be cleaned, on the one hand, and a moist gas, for example a mixture of nitrogen and water vapour containing several percent by volume of water vapour, on the other hand, are introduced into this reactor 1. The following reaction is thus carried out:

$$Na+H_2O \rightarrow NaOH+1/2H_2$$

wherein some hydrogen atoms are replaced by tritium atoms which were present in the sodium, so as to obtain at the exit from the reactor a gas containing not only hydrogen $H_2$ but also HT or even $T_2$, in addition to unreacted nitrogen and water vapour, while the soda which is also tritiated, is optionally evacuated from the reactor in the form of water containing sodium which may be used thereafter in the cementation process which will be discussed later.

The gases and vapours leaving the reactor 1 then enter a catalytic recombiner 2 where they are mixed with oxygen or air in order to perform the reaction $$H_2+1/2O_2 \rightarrow H_2O$$

or $HT+V_21/2O_2 \rightarrow HTO$ or $T_2+1/2O_2T_2O$

The catalytic recombiner 2 contains a catalyst which enables these reactions to be carried out even when the conditions for their spontaneous initiation are not all present, for example when the concentration by volume of hydrogen is less than 4%. The gas to be treated passes through this catalyst, which is generally palladium deposited on alumina sheets, flakes or pellets over which the gas passes.

The recombiner 2 itself is most preferably preceded by a mixing chamber in which oxygen or air injected into the gas to be treated, so as obtain a homogeneous mixture. If desired, a preheater preheats the mixture before it enters the actual recombiner 2. The latter may also be equipped with a preheating device enabling it to be heated above 100° C., for example, to make the catalyst active if necessary. Finally, a debubbler may separate the liquid particles from the gas current before entering the recombiner 2. Other pre-treatments for this gas current before it enters the recombiner 2 may be provided.

Inside the recombiner 2 the gases may circulate by forced convection to which may be added an element of natural convection when the circulation is from the bottom upwards, because of the heating of the gas after the catalysed reaction. The circulation may also be purely by natural convection, from the bottom upwards.

Devices for protecting against excess pressure can prevent the recombiner 2 from exploding when a larger than intended quantity of hydrogen and oxygen is recombined in an uncontrolled manner, causing a rise in temperature and pressure in the recombiner 2. The temperature of the gas is advantageously controlled throughout its travel in the recombiner 2.

The plant may be fitted with a single recombiner 2 or with a plurality of such recombiners 2 arranged in series and separated by coolers which bring the gases leaving a recombiner 2 to a temperature suited to good recombination in the next mixer/recombiner 2 assembly.

At the exit from the recombiner 2, the gaseous effluent made up of nitrogen, water and tritiated water enters a condenser 3 where the nitrogen on the one hand and the water and tritiated water on the other hand are separated. The dry nitrogen may be discharged into the atmosphere as it no longer contains residues of tritiated water vapour. The condensate of water and tritiated water can be stored or processed. It can be processed in a cementation plant 4 to participate in the formation of a concrete in which the tritium activity is acceptable.

Alternatively, the water and the tritiated water may be separated from the nitrogen in an apparatus other than a condenser, for example a molecular sieve.

An alternative embodiment of the process shown in FIG. 2 comprises adding $CO_2$ to the nitrogen and water vapour injected into the reactor 1. Typically, the content of water vapour is a few percent by volume (2%, for example), the content of $CO_2$ is some tens of percent by volume (20%, for example), the nitrogen representing the remainder of the gaseous mixture. In this way sodium is present in the form of carbonate and/or bi-carbonate, some of the latter being in its tritiated form $NaTCO_3$. These compounds can then be washed with water, and the washing water can then be directed onto the cementation plant 4. It should be noted that in this alternative embodiment the tritiated water collected at the exit from the condenser 3 cannot always be used in the cementation plant 4 as this might lead the tritium content of the concrete becoming too high.

The respective proportions of carbonate and bi-carbonate depend on the temperature conditions and composition of the carbonation gases, in particular.

According to an alternative embodiment of the invention it is proposed to recycle some or all of the effluents obtained after the operation of separating the water vapour in the condenser 3 (or any apparatus of equivalent function), so as to involve them in the operation of hydroxidation or carbonation of the sodium in reactor 1.

In fact, if the destruction of the sodium is affected by final production of sodium hydroxide (hydroxidation) in the reactor 1, this reaction is written as follows:

$$Na+H_2O \rightarrow NaOH+1/2H_2 \uparrow$$

Then, in the recombiner 2 the following reaction takes place:

$$1/2H_2+1/4O_2 \rightarrow 1/2H_2O$$

It will be seen that on its own the recombiner 2 is capable of supplying, from the hydrogen produced in the reactor 1, half the water (liquid or vapour) which, in continuous operation, would be needed to destroy the sodium (in addition to the quantity of water needed to initiate the function of the plant).

Using this water to produce the global reaction $$Na+1/2H_2O+1/4O_2 \rightarrow NaOH$$

means that it is possible to save on water and to keep the tritium in the plant without discharging it to the outside in continuous manner. FIG. 3 shows a plan of a plant adapted for the destruction of sodium by injection into a reactor 5 containing water (the elements in common with those in FIG. 1 have been given the same reference numerals). The water leaving the condenser 3 and the aqueous solution of sodium hydroxide leaving the reactor 5 are both recycled upstream of the reactor 5 to participate in the water supply. One consequence of this is that the water containing sodium which results from the destruction of the sodium contains tritium, in fact the majority of this element. In parallel, a small part of this sodium-containing water is continuously directed towards the cementation plant 4. The small amount of non-tritiated water added to the reactor 5 can be adjusted to maintain an appropriate concentration of sodium hydroxide in the sodium-containing water sent to the cementation plant 4.

If the destruction of the sodium is carried out by carbonation in reactor 1, the formation of sodium carbonate is written as follows:

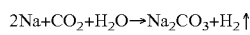
$$2Na + CO_2 + H_2O \rightarrow Na_2CO_3 + H_2\uparrow$$

Then the following reaction takes place in the recombiner 2:

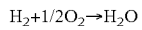
$$H_2 + 1/2 O_2 \rightarrow H_2O$$

By itself, the recombiner is capable of supplying all the water which, in continuous operation, is needed to form the sodium carbonate.

Similarly, the formation of sodium bicarbonate in the reactor 1 is written as follows:

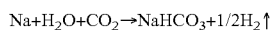
$$Na + H_2O + CO_2 \rightarrow NaHCO_3 + 1/2 H_2\uparrow$$

and in the recombiner 2:

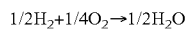
$$1/2 H_2 + 1/4 O_2 \rightarrow 1/2 H_2O$$

The recombiner is thus capable of supplying, in continuous operation, half the water needed to produce sodium bicarbonate.

In this case, it is advantageous to recycle the water produced into the condenser 3 upstream of the reactor 1.

FIG. 4 shows a diagram of the plant in FIG. 2 which has been modified for this purpose (common elements bear the same reference numerals). It will be seen that before entering the sodium carbonating reactor 1, the nitrogen, $CO_2$ and water added to the plant pass through a carbonating chamber 6 which serves to produce the gaseous mixture for destroying the sodium, where they are mixed on the one hand with the gases leaving the condenser 3 ($N_2$, $CO_2$ and residues of water and tritiated water), and on the other hand with the liquid water and tritiated water leaving the condenser 3.

In this embodiment of the invention, all waste is eliminated other than sodium carbonate and bicarbonate, the majority of the tritium being in the bicarbonate. These can be eliminated from the components by washing with water, and the washing water can then be used in the cementation plant 4. Alternatively, only the water and tritiated water leaving the condenser 3 may be recycled and the gaseous effluents may be allowed to escape into the atmosphere if in particular it is found that the traces of tritium which they contain are negligible.

Alternatively a plant of the type shown in FIG. 5 may be used. Compared with the previous one it is characterised in that there is no condenser 3: the gaseous effluent ($N_2$, $CO_2$ water vapour and tritiated water) leaving the recombiner 2 are transmitted directly to the carbonation chamber 6. Another difference from the previous plants (but which might be transposed to them) is that not only oxygen but also hydrogen is injected into the recombiner, in order to form the quantity of water needed to carry out carbonation of the sodium. Thus it is possible to do away with the addition of external water at the carbonation chamber 6. In particular, the water needed to initiate the carbonation reaction may be produced in the recombiner 2.

It should be understood that both the fact of recycling the effluents leaving the recombiner 2 and the fact of adding hydrogen to the recombiner 2 may also be used in processes in which sodium is destroyed by reacting with water vapour on its own or with liquid water.

The alternative embodiment in FIG. 4, using a condenser and an external water supply, is easier to control than the plant in FIG. 5, and uses a carbonation chamber 6 of highly conventional design into which are injected on the one hand a gas to be humidified charged with $CO_2$ and on the other hand liquid water. However, the alternative embodiment in FIG. 5, which does away with the condenser 3, lowers the material costs.

In the plants described above (with the exception of the one in FIG. 5), an essential component is the condenser 3 which recovers the water vapour and tritiated water vapour leaving the catalytic recombiner 2, as these vapours contain virtually all (where the sodium is destroyed en mass with liquid water) or a considerable proportion (where the components are washed with moist nitrogen or carbonation) of the tritium which is to be recovered. It is therefore important to optimise the performance of this condenser 3, particularly when the content of water vapour in the gases entering it is low, which is often the case. In fact, the gas treatment right up to the point of entering the recombiner 2 often by design has a low hydrogen content with the aim of limiting the hydrogen risk.

To this end, it is advantageous to associate a conventional condenser 3 with a desiccator with regenerable desiccant, of a type known per se to form the means for separating water and tritiated water from the other compounds extracted from the recombiner 2.

It will be recalled that a desiccator with regenerable desiccant operates according to the following principle. The moist gas which is to be dried passes through a layer of desiccant (such as silica gel). When this layer has absorbed a certain amount of moisture it is removed from the path of the gas which is to be dried, so that a hot regeneration gas passes through it at a lower speed, which enables the dessicant to be charged again with moisture after having restored the desiccant to its original state. In parallel, the gas to be dried passes through another layer of desiccant which has previously been regenerated to ensure that the process is continuous.

A regenerable desiccant of this kind may comprise two totally separate beds of desiccant which are used alternately, one being supplied with gas for drying while the other is supplied with regeneration gas. It may also be of the "sorption wheel" type diagrammatically shown in FIG. 6. The silica gel or any other desiccant is contained in a sorption wheel 7 which is rotated, for example by means of a motor 8 and a belt 9. The moist gas to be dried 10 is fed onto one side of the wheel 7 and passes through the wheel 7 under the effect of pumping means 11, and the gas current 12 leaving the wheel 7 is therefore dry. At the same time, a current of regeneration gas GR 13 is fed onto the other side of the wheel 7 after having passed through a reheater 14. This supply of hot gas (at 120 to 140° C., for example) is provided over only a limited sector of the wheel 7, defined by fixed partitions 15, 16 arranged on either side of the wheel 7. Under the effect of pumping means 17, the hot gas passes through the wheel 7 in said sector and the current 18 leaving it is a current of regeneration gas charged with the moisture extracted from the desiccant through which it has passed, this desiccant now being regenerated as a result. The rotation of the wheel 7 affected by the motor 8 and belt 9 means that each portion of desiccant is successively traversed by gas which is to be dried and then by hot regeneration gas in order to regenerate the desiccant.

Desiccators of this kind enable highly dried currents to be obtained with dew points of up to −40° C.

Different methods of using desiccators with regenerable desiccant of this kind within the scope of the invention may be proposed.

In the embodiment shown in FIG. 7, the condenser 3 receives, as explained previously, a gas current made up of nitrogen (except in the case of the destruction of sodium en mass with liquid water, unless air has been injected into the recombiner 2), residual $CO_2$ (if the sodium has been carbonated), water vapour and tritiated water vapour. The water and the tritiated water are condensed and extracted from the condenser 3, so that the gas current leaving the condenser 3 contains only residues of water and tritiated water. In order to eliminate these residues still further, this gas current is passed into a desiccator with regenerable desiccant 19 and a gas current which has been highly dried leaves the desiccators. At the same time, the desiccators 19 receives a current of hot regeneration gas GR which leaves the desiccators 19 having picked up some of the water and tritiated water trapped by the desiccators 19. The regeneration gas and the water and tritiated water which it contains are injected upstream of the condenser 3. By this method, the quantity of water and hence tritiated water escaping from the plant is reduced still further by the presence of the desiccators 19.

It is also advantageous that, as shown by the dotted arrow 20 the dry gases leaving the desiccator 20 are at least partly used, optionally after reheating, as the regeneration gas GR for the desiccator 20.

It is also possible, as shown in FIG. 8, to use several condenser/desiccators with regenerable desiccant assemblies arranged in cascade. A first condenser 21 receives the moist gases coming from the catalytic recombiner 2. The condensed water and tritiated water are extracted therefrom to be stored or treated in one of the ways described above and the gases containing only residues of water and tritiated water are extracted from the first condenser 21 and passed into a first desiccator 22 where they are subjected to extensive dehumidification. The dehumidified gases are evacuated outside the plant. In parallel, a regeneration gas for the desiccant GR is injected into the first desiccator 22. It leaves the first desiccator 22 charged with water and tritiated water which have been trapped by the desiccant, and is injected into a second condenser 23.

The water and tritiated water condensed in this second condenser 23 are extracted therefrom in order to be treated, and the gases leaving the second condenser 23 are passed into a second desiccator 24 in which they lose their residual moisture before being evacuated from the plant. In parallel, a regeneration gas for the desiccant GR is injected into the second desiccator 24 and emerges from it charged with water and tritiated water trapped by the desiccant, to be injected into a third condenser 25. The water and the tritiated water which condense therein are extracted in order to be treated, and the gases which come out (essentially the regeneration gases of the second desiccator 24) are evacuated from the plant. It goes without saying that an assembly comprising a number n of condensers other than 3 and a number n−1 of desiccators other than 2 could also be used. It would also be possible, here, to use as the regeneration gas GR for the desiccators 22, 24, at least some of the dehumidified gases leaving these same desiccators 22, 24, optionally reheated beforehand. Finally, the condensers 3, 21, 23, 25 could be replaced by any other type of means for separating the water and the tritiated water from the other components of the effluent being treated.

According to another alternative embodiment of the invention additional humidification, with non-tritiated water, of the gases leaving the recombiner 2 is carried out before and/or during their treatment by the system for separating water vapour. This alternative embodiment is diagrammatically shown in FIG. 9 by means of arrows 26, 27, if this additional humidification is carried out before and/or in the condenser 3, and is applied to a plant which in other respects is the same as that in FIG. 1. However, it should be understood that it is also applicable to the other embodiments of installations according to the invention which have been described, with the exception of the embodiment in FIG. 5 where no condenser is used. In particular it is applicable to FIG. 8, where the water may, for example, be added to the gaseous effluents entering or present in all the condensers 21, 23, 25 or only in some of them. It is also applicable if an apparatus for separating water and tritiated water from the other gaseous components is used, other than a condenser.

If one or more condensers 3, 21, 23 coupled to desiccators with regenerable desiccant 19, 22, 24 is used, the injection of water may take place between the condenser 3 and the desiccator 19, between the condenser 21 and the desiccator 22, between the desiccator 22 and the condenser 23, between the condenser 23 and the desiccator 24 and between the desiccator 24 and condenser 25.

This method is particularly applicable if the moisture content of the gases leaving the recombiner 2 is low, of the order of a few percent by volume, for example 1%. This low content derives from the fact that, in order to control the risks represented by hydrogen, it is desirable to keep the hydrogen content in the plant below the lower limit for flammability in air of hydrogen, with a security margin. This limit is about 4% by volume. The content of water vapour and tritiated water vapour at the exit from the recombiner 2 is hence also low: it is equal to the hydrogen content of the gas entering the recombiner 2, if this gas is not already moist, if the recombination is total and if the combustible material is pure oxygen.

If $Q_m$ is the mass flow of water in the gaseous effluent before the condenser 3, $Q_{mf}$ is the mass flow of residual water in the gaseous effluent leaving the condenser 3 and A is the activity flow rate of the tritium (in the form of tritiated water) in the gaseous effluent:

the mass flow of water recovered at the exit from the condenser 3 is equal to $Q_m - Q_{mf}$;

the activity flow rate of the tritium recovered at the exit from the condenser 3 is $$\frac{Q_m - Q_{mf}}{Q_m} A = \left(1 - \frac{Q_{mf}}{Q_m}\right) A$$

If $Q_h$ is the mass flow rate of additional humidification, the flow rate of water recovered at the exit from the condenser 3 becomes $(Q_m + Q_h) - Q_{mf}$.

The activity rate of the tritium recovered becomes:

$$\frac{(Q_m + Q_n) - Q_{mf}}{(Q_m + Q_n)} A = \left(1 - \frac{Q_{mf}}{(Q_m + Q_n)}\right) A$$

It is therefore greater than it is when no additional humidification is provided; therefore, the amount of tritium recovered in the condensate is greater than is the case if this additional humidification is not carried out.

This calculation supposes that the residual flow rate of water in the gaseous effluent leaving the condenser is not affected by the additional humidification, in other words the condenser 3 provides a substantially constant hygrometry for the gaseous effluent at the exit, irrespective of the moisture level at the entrance to the condenser 3. This supposition is important because the volume flow rates of moist gases and their water content are sufficiently below the nominal treatment capacity of the condenser 3 and that multiplying the quantity of humidity present in the gases entering or contained in the condenser 3 by 2 to 4 (for example) does not radically alter the operation of the condenser.

This method has the drawback of substantially increasing the quantity of partially tritiated liquid water collected downstream of the condenser 3. However, if, as is the case when treating components coming from the dismantling of fast neutron reactors such as the active cold traps of the sodium circuits, the quantities of water involved are small and have a high tritium activity, this increase does not result in radical modification to the dimensions of the plant. Treating a large capacity cold trap releases about 10 kg of hydrogen, and therefore about 100 liters of water and tritiated water. Multiplying this relatively small amount by 2 to 4 or even more does not give rise to particular technical or economical problems.

It should be understood that the invention has largely been described in detail with reference to the treatment of materials contaminated with sodium (or any other alkali metal and its derivatives), over which a current of water vapour and neutral gas is passed. However, the invention in its various embodiments is also applicable where sodium is destroyed by injection into a reactor 5 containing water, as shown in FIG. 3. In this case, one difference from the examples described is that the gaseous currents leaving the reactor 5 do not contain any neutral gas such as nitrogen.

The invention claimed is:

1. Process for treating alkali metals such as sodium charged with tritium or components contaminated with alkali metals such as sodium charged with tritium, in which the alkali metal is reacted with liquid water or water vapour, so as to obtain hydrogen and tritiated hydrogen, characterised in that the hydrogen and the tritiated hydrogen are subjected, in a recombiner (2) to a treatment of catalytic recombination by the addition of oxygen so as to obtain water and tritiated water, and in that the water and the tritiated water are treated so that they are not discharged into the environment.

2. Process according to claim 1, characterised in that the alkali metals are treated with water vapour mixed with a neutral gas.

3. Process according to claim 1, characterised in that the alkali metals are reacted with water vapour and CO2 mixed with a neutral gas and in that the reaction of the alkali metals with the water vapour and the CO2 produces the carbonate of said metals and/or the partially tritiated bicarbonate of said metals.

4. Process according to claim 1, characterised in that after the catalytic recombination, the water and tritiated water on the one hand and the remainder of the gaseous effluent on the other hand are separated in separating means.

5. Process according to claim 4, characterised in that the separation takes place in a condenser (3, 21, 23, 25) in which the water and the tritiated water are condensed.

6. Process according to claim 4, characterised in that the water and tritiated water collected at the exit from the separating means are recycled in order to participate in the reaction of the alkali metals with liquid water or water vapour and optionally with CO2.

7. Process according to claim 6, characterised in that the remainder of the gaseous effluent is also recycled in order to participate in the reaction of the alkali metals with water vapour and optionally with CO2.

8. Process according to claim 1, characterised in that hydrogen is also added during the catalytic recombination.

9. Process according to claim 2, characterised in that after the catalytic recombination the water, the tritiated water, the neutral gas and any CO2 are recycled in order to participate in the reaction of the alkali metals with water vapour and optionally CO2, without separation of the water and tritiated water from the neutral gas and any excess CO2.

10. Process according to claim 4, characterised in that the remainder of the gaseous effluent separated from the water and tritiated water passes through a desiccator with regenerable desiccant (19) and in that the hot regeneration gas having passed through said desiccator (19) is recycled upstream of said separating means (3).

11. Process according to claim 10, characterised in that at least some of the dried gases leaving the desiccator with regenerable desiccant (19) are used, optionally after reheating, as a hot regeneration gas for the desiccator (19).

12. Process according to claim 4, characterised in that the remainder of the gaseous effluent essentially separated from the water and tritiated water passes through a set of desiccators with regenerable desiccant (22, 24) and means for separating the water and tritiated water, such as condensers (23, 25) arranged in cascade, the hot regeneration gas leaving each desiccator (22, 24) being passed into said means for separating the water and tritiated water.

13. Process according to claim 4, characterised in that non-tritiated water is added to the gases leaving the recombiner (2), upstream of said separating means and/or into said separating means.

14. Process according to claim 1, characterised in that the tritiated liquid effluent is treated in a cementation plant (4).

* * * * *